United States Patent [19]
Greiser

[11] Patent Number: 5,565,751
[45] Date of Patent: Oct. 15, 1996

[54] ENHANCED TRACTION SYSTEM FOR TROLLEYBUSES, POWERED FROM A 600-VOLT DIRECT CURRENT POWER LINE

[75] Inventor: Gabriel G. Greiser, Cuernavaca, Mexico

[73] Assignee: Trinity Industries, Inc., Dallas, Tex.

[21] Appl. No.: 314,048

[22] Filed: Sep. 28, 1994

[51] Int. Cl.$^6$ ....................................... H02P 5/34
[52] U.S. Cl. ................ 318/801; 318/362; 318/376; 318/432; 318/826; 180/2.1; 190/5
[58] Field of Search ........................... 318/139, 362, 318/376, 261, 432, 433, 434, 741, 798–815, 826; 363/13, 50; 180/2.1, 313; 190/50

[56] References Cited

U.S. PATENT DOCUMENTS

| | | | |
|---|---|---|---|
| 3,774,095 | 11/1973 | Coccia | 318/139 |
| 3,866,702 | 2/1975 | Eastham | 318/139 X |
| 4,419,610 | 12/1983 | Pollman | 318/139 X |
| 4,502,558 | 3/1985 | Mauri | 180/313 |
| 4,904,918 | 2/1990 | Bailey et al. | 318/759 X |
| 4,928,227 | 5/1990 | Burba et al. | 318/139 X |
| 5,283,507 | 2/1994 | Stitt et al. | 318/376 |
| 5,331,261 | 7/1994 | Brown et al. | 318/376 |
| 5,345,154 | 9/1994 | King | 318/139 X |
| 5,396,214 | 3/1995 | Kumar | 318/376 X |

*Primary Examiner*—William M. Shoop, Jr.
*Assistant Examiner*—Karen Masih
*Attorney, Agent, or Firm*—Baker & Botts, L.L.P.

[57] ABSTRACT

An electrical system that receives power from an external power source that includes an inverter (U1). The inverter (U1) receives DC power and generates a variable voltage output. First and second current collectors (30, 32) connected to the inverter (U1) and receive the DC input through contact with positive and negative poles of the external power source. A motor (M1) and an internal DC bus (+,−) are connected to the current collectors (30,32). A protection circuit is connected across the internal DC bus (+,−), and protects the inverter (U1) from connection to an input of improper polarity. The protection circuit permits the inverter (U1) to deliver a DC output to the power source during a regenerative braking operation.

16 Claims, 3 Drawing Sheets

ENHANCED TRACTION SYSTEM FOR TROLLEYBUSES, POWERED FROM A 600-VOLT DIRECT CURRENT POWER LINE

TECHNICAL FIELD OF THE INVENTION

This invention relates to the electronic circuits which are necessary to use an industrial inverter in the regenerative electrical traction and braking of a trolleybus powered from a 600 V direct current power line, in which the vehicle's current collectors are united electrically as the vehicle passes by power line switch points and crossings.

BACKGROUND OF THE INVENTION

Electric trolleybuses are presently powered by an electromechanical system formed by a thyristor (chopper)-based electronic inverter and a direct current (DC) motor with non-regenerative composite excitation. A chopper is a DC to DC converter that converts DC power at a first voltage to DC power at a second voltage. Thus, electric trolleybuses are typically powered by a DC power system, as opposed to an alternating current (AC) power system. The chopper is used to control the power generated by the DC motor, which is proportional in some manner to the applied voltage to the DC motor.

SUMMARY OF THE INVENTION

Therefore, a need has arisen for a trolleybus traction system that can operate on AC power. The trolleybus of the present invention is powered by an electromechanical system formed by an inverter which produces a three-phase variable voltage and frequency current and a three-phase asynchronous motor, and thereby offers the advantages related to a three-phase, asynchronous, squirrel cage, four-pole, fully-enclosed, external fan motor. It is the simplest prime motor in electromechanical technology, as the same needs no collector, brushes, auxiliary excitation circuits, etc.

The antifriction bearings are the only pieces of the squirrel cage three-phase asynchronous motor that wear off and may be long-lasting if properly lubricated. It is not necessary to disassemble the motor in order to lubricate them.

The squirrel cage three-phase asynchronous motor need not be cleaned internally because it is fully enclosed and does not have inside any element that causes dirt particles, as is the case of the direct current motor, which causes conductor debris, copper from the collector and carbon from the brushes.

The squirrel cage three-phase asynchronous motor has the easiest to replace coil and the least copper content; it is a single-coil motor, as opposed to the direct current motor with assembly coils, series field, parallel field and exchange poles.

The inverter used is readily available in the industrial electrical and mechanical market and may be purchased from many makers.

Thanks to the inverter's great computational power it is possible to implement innumerable protective and informative functions of the motor, inverter and the vehicle's operation and driving.

The inverter does not need sophisticated reactors (inductors) due to the following basic reasons: (i) it uses the greater intrinsic inductance of induction motors, and (ii) it generates a quasi-sine current wave as opposed to the large inductor requirements of the chopper, which generates a chopped DC waveform that must be "smoothed out" by inductors.

The inverter's efficiency is greater than that of the chopper. An inverter is a great deal smaller and lighter than a chopper. The vehicle's kinetic energy is automatically recovered in the inverter, which sends this energy to the overhead line, if the line voltage is not too high.

The inverter/asynchronous motor combination is less expensive than the chopper/direct current motor combination, and the world trend is to reduce the price even more.

The inverter is made up by easy-to reach basic parts: a D.C. bus contactor; a D.C. bus with capacitors; a power transistor package; a transistor-based control printed circuit; and a printed circuit with a microprocessor.

Trolleybus braking efficiency is achieved through regenerative braking. The trolleybus is capable of driving in zones where current collectors are electrically united. The trolleybus has a low maintenance cost thanks to the use of a squirrel cage asynchronous traction motor. The trolleybus is a low-price vehicle because industrial components are used and is therefore cost-efficient.

BRIEF DESCRIPTION OF THE DRAWINGS

For a more complete understanding of the invention and the advantages thereof, reference is now made to the following description taken in conjunction with the accompanying drawings, in which like reference numbers generally indicate like features unless specified otherwise, and wherein.

DETAILED DESCRIPTION OF THE INVENTION

Preferred embodiments of the present invention are illustrated in the FIGURES, like numerals generally being used to refer to like and corresponding parts of the various drawings, with specific FIGURES noted otherwise.

Figure 1:
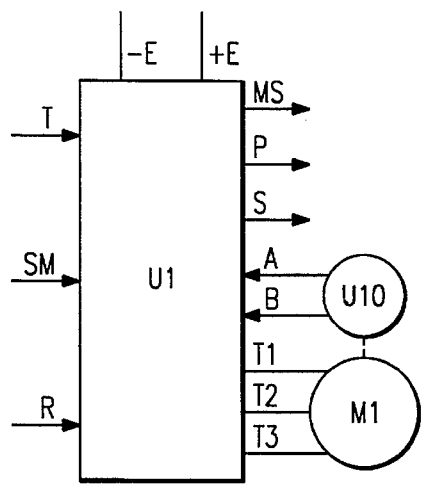
FIG. 1 is a diagram showing the inputs and outputs to the commercially-available inverter.

FIG. 1 is a diagram showing the inputs and outputs to inverter U1, which is a commercially available inverter containing control circuitry. Enough electric power to propel and regeneratively brake the vehicle with 440 V three-phase asynchronous traction motor M1 is supplied as DC power to inverter input leads −E and +E. The output of the inverter on leads T1, T2, and T3 is the input voltage to the motor, and is 440 V 3-phase 60 Hz. The voltage range that may be applied to leads −E and +E is 450 V DC minimum and 750 V DC maximum. Digital electronic input port R of inverter U1 provides a control signal to activate inverter U1. Digital electronic input ports A and B of inverter U1 are coupled to two-channel encoder U10, which provides feedback on the operational characteristics of traction motor M1.

Analog electronic input port T of inverter U1 is responsive to control signals that cause traction motor M1 to selectively generate motive torque (positive) or regenerative torque (negative). Analog electronic input port SM is responsive to controls that cause traction motor to selectively change speed. Digital electronic output port MS changes value when traction motor U1 reaches a minimum speed. Analog electronic output port P outputs a signal that is in known proportion to the power of traction motor U1. Analog electronic output port S outputs a signal that is in known proportion to traction motor U1 speed.

The embodiment of the invention may be divided into three parts. The first part is a modification of inverter U1 to permit the use of 600 V DC power. The second part is a modification of inverter U1 to prevent its capacitors from discharging due to a short circuit in the current collectors (not explicitly shown). The third part is the interface circuits between the vehicle driver and inverter U1.

Figure 2:
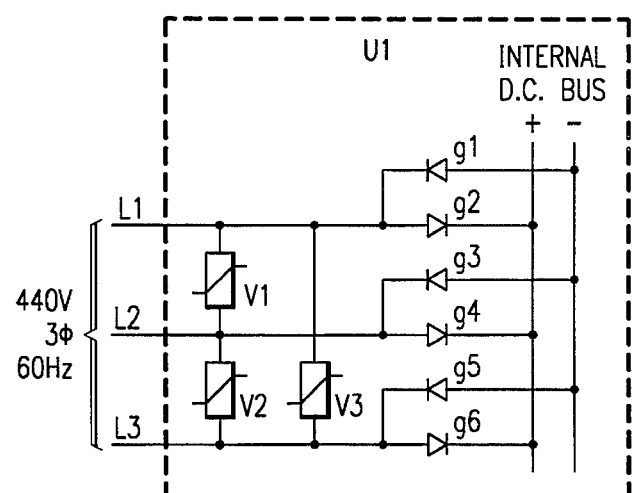
FIG. 2 shows a circuit diagram of a typical three-phase inverter.

FIG. 2 shows a portion of the internal circuitry of typical three-phase inverter U1 in FIG. 2. As previously noted, inverter U1 is characteristic of many commercially available inverters. In the embodiment shown in FIG. 2, inverter U1 has six diode packages g1 through g6, which are used to rectify the applied DC power from internal DC bus leads + and − to provide three-phase AC power output to leads L1, L2, and L3, which are connected to leads T1, T2, and T3, respectively, of inverter U1. These diodes are protected from transients on L1–L3 by varistors V1–V3 in FIG. 2.

Figure 3:
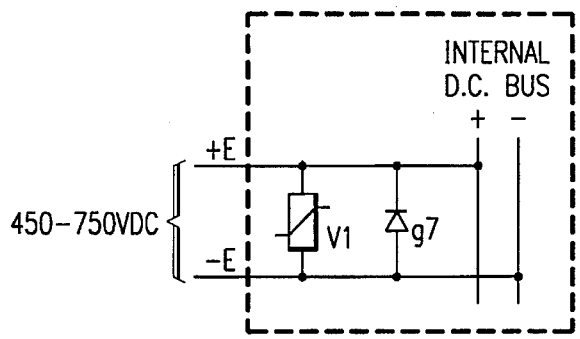
FIG. 3 presents a circuit diagram of the protective circuitry for an internal DC bus.

FIG. 3 presents a circuit diagram of the protective circuitry for internal DC bus leads + and −. Diode g7 protects internal DC bus leads + and − from connection to the wrong polarity. Varistor V1 in FIG. 3 limits potential voltage transients that may damage diode g7. These changes allow the inverter to both receive power from and transmit power produced by regenerative braking to the 600 V DC supply connected to leads E+ and E−.

Figure 4:
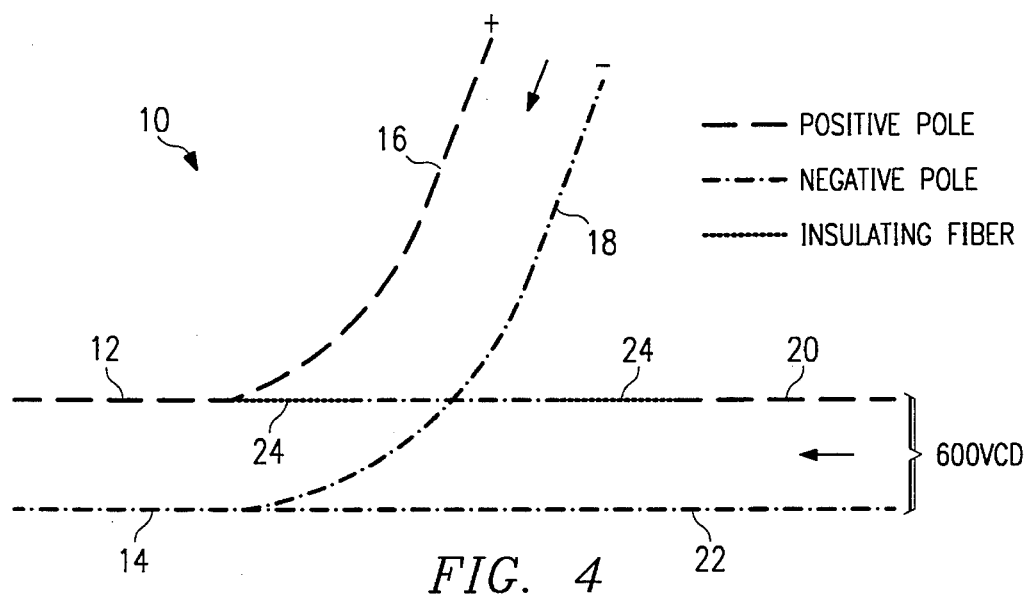
FIG. 4 displays an example of a trolley power supply at a junction of two lines.

FIG. 4 displays an example of a trolley power supply at a junction of two lines. Line pairs 16–18 and 20–22 join in FIG. 4 at line pair 12–14. Insulating fiber 24 is installed between line 12 and lines 16 and 20. Nevertheless, the current collectors of the trolley car (not explicitly shown) will be short-circuited when the vehicle goes through power line crossings and switch points. Therefore, it is necessary to disconnect the current collectors from inverter U1 when the trolleycar goes through such power line crossings. This operation must be made quickly and therefore cannot be accomplished by electromechanical means, such as with a relay. It should be noted from FIG. 4 that the short circuit is preceded by a disconnection from conductor 20 as the current collector passes along conductor 20 and onto insulating fiber 24.

Figure 5:
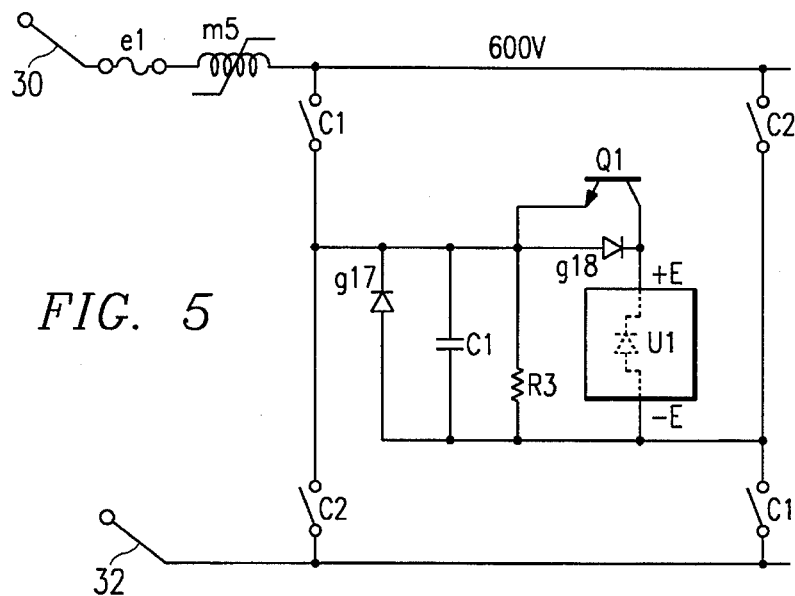
FIG. 5 is a circuit diagram of the power supply to an inverter from the current collectors of a trolley car in accordance with the present invention.

FIG. 5 is a circuit diagram of the power supply to an inverter from the current collectors of a trolley car in accordance with the present invention. The electric current used or generated by the electric vehicle flows from contactors 30 and 32 through inductor m5, which reduces the magnitude of di/dt in the current and thus prevents damaging transients. This current is pulsating due to the frequency of the carrier wave which is necessary to produce the variable frequency sine current that inverter U1 applies to traction motor M1. When this voltage drops to zero, this indicates that current collector 30 or 32 has contacted insulating fiber 24 in FIG. 4.

Figure 6:
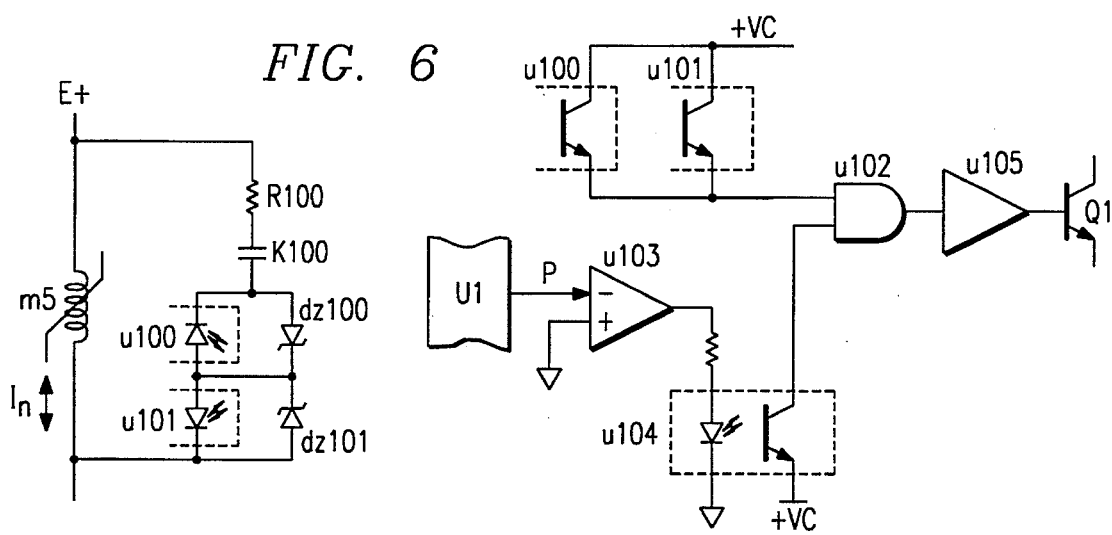
FIGS. 6, 7, 8, 9, 10, and 11 display circuit diagrams of control circuitry in accordance with the present invention.

FIG. 6 displays a circuit diagram of control circuitry in accordance with the present invention. Voltage is applied from lead E+ to resistor R100, capacitor K100, and to the LEDs of optic couplings u100 and u101. Each optic coupling consists of an LED and transistor pair, with the gate of the transistor being responsive to light emitted from the LED. Zener diodes dz100 and dz101 protect the LEDs of optical couplings u100 and u101, respectively, from transient voltages. Current collectors 30 and 32 in FIG. 5 and inverter U1 may be disconnected through transistor Q1 to prevent inverter capacitor C1 from discharging. Diode g17 in FIG. 5 conducts the current used by inverter U1. Contact pairs C1 and C2 in FIG. 5 are used to maintain the proper polarity of the power supplied to inverter U1.

Diode g17, capacitor C1, and resistor R3 of FIG. 5 protect transistor Q1, diode g18, and inverter U1 from transient currents and voltages. Output transistors of optical couplings u100 and u101, respectively, are connected in parallel, and conduct when current collectors 30 and 32 are energized, thus causing a voltage equal to logic high (VC) to be applied to one of the inputs of AND gate u102. Output P of inverter U1 is coupled to comparator u103, which will output logic high if output P is negative, signifying that inverter U1 is supplying power to the system (i.e. the trolleybus is regeneratively braking). Comparator u103 output is carried to optic coupling u104. As previously noted, optic coupling u104 comprises an LED and transistor pair. The transistor of optical coupling u104 is turned on by the LED of optical coupling u104 if the vehicle is regenerating, thus applying logic high to the second input to AND gate u102.

The output of AND gate u102 is coupled to amplifier u105, which is coupled to the gate of transistor Q1. Transistor Q1 is thus "on" when the vehicle is regenerating, and current collectors 30 and 32 have not been disconnected from the power source, thus connecting inverter U1 to leads E+ and E−.

Figure 7:
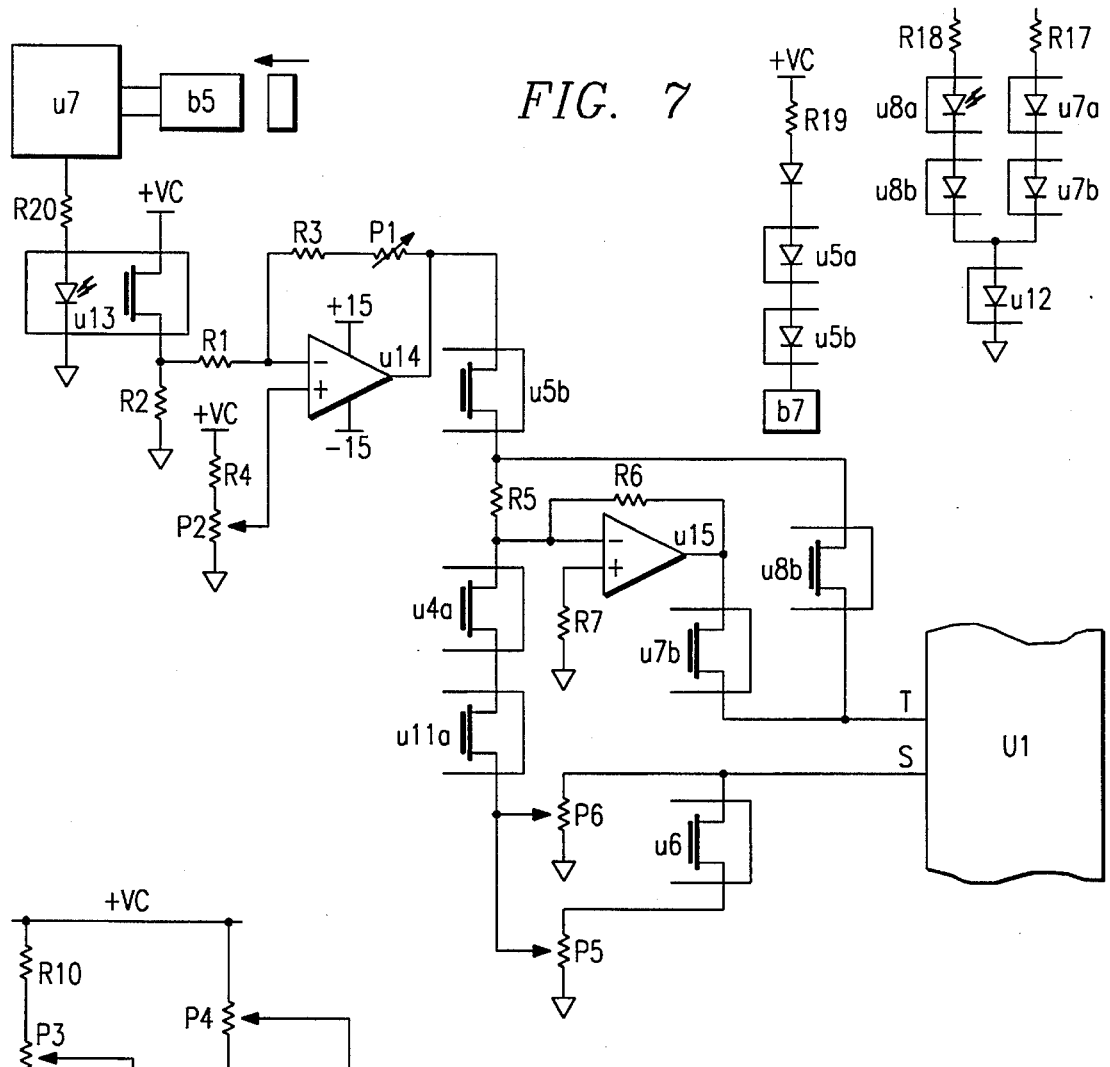

FIG. 7 is a circuit diagram of control circuitry in accordance with the present invention. User-entered controls are applied to accelerator pedal b5 and the brake pedal (not explicitly shown). Accelerator pedal b5 provides a user-controlled input to amplifier U7, which produces a current ranging from 4 to 20 mA. This current flows through resistor R20 and the LED of optic coupling u13, such that the current in the LED of optic coupling u13 increases in response to user-entered control of accelerator pedal b5. In addition, the current through the LED of optic coupling u13 allows detection of the release of the accelerator b5, namely, when the current from amplifier U7 drops to its minimum output value.

The output of the transistor of optical coupling u13 is carried through resistors R1 and R2 to the amplification circuit formed by resistor R4, potentiometer P2, operational amplifier u14, resistor R3 of FIG. 7, and potentiometer P1 of FIG. 7. Amplifier u14 output is coupled to the gate of the transistor of optic coupling u5b. The drain of the transistor of optic coupling u5b is coupled to the inverter circuit formed by operational amplifier u15, resistor R6, and resistor R7. Amplifier u15 is coupled to the gate of the transistor of optic coupling u7b. The drain of the transistor of optic coupling u7b is coupled to input port T of inverter U1.

Thus, if the transistors of optic couplings u5b and u7b are in conduction mode, user control of accelerator pedal b5 will cause a controllable voltage to be applied to the inverter's analog input port T. As previously noted, input port T of inverter U1 causes motor M1 to selectively generate motive torque (positive) or regenerative torque (negative). Thus, the vehicle will run at the speed that the acceleration conditions, vehicle weight, road slope and other factors permit, propelled by the magnitude of the motive torque requested to the inverter U1 through the position of the accelerator pedal b5.

The transistor of optic coupling u7b conducts if the vehicle driver selects forward drive by moving a switch (not explicitly shown) to a position that excites the LED of optic coupling u7b through resistor R17, and the LEDs of optic couplings u7a and u12. The inverter circuit formed by amplifier u15, resistor R6, and resistor R7 also receives an analog signal from output port S of inverter U1 through the transistors of optic couplings u4a, u11a, and u6, and potentiometers P5 and P6. The transistor of optic coupling u4a is normally conducting, and the transistor of optic coupling u11a is conducting only if the motor speed exceeds the minimum speed, as shown in FIG. 8.

Figure 8:
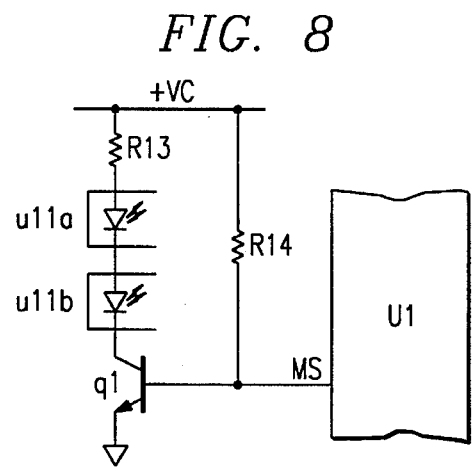

FIG. 8 is a circuit diagram of control circuitry in accordance with the present invention. The base of transistor q1 of FIG. 8 is connected to input port MS of inverter U1, which outputs logic high when motor M1 is operated at more than a minimum set speed, thus turning on transistor q1 of FIG. 8.

Figure 9:
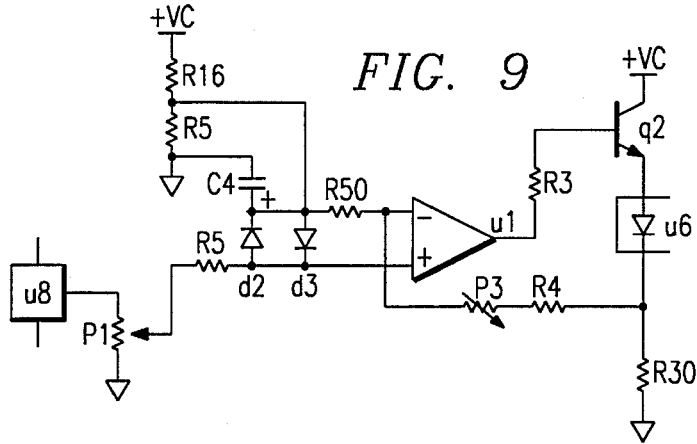

FIG. 9 shows a circuit diagram of control circuitry in accordance with the present invention. Optic coupling u6 is excited in proportion to the air pressure of the actuators of the vehicle brakes (not explicitly shown). Transducer U6 converts the air pressure of the actuators of the vehicle brakes into a voltage signal. Potentiometer P1 of FIG. 9 divides this voltage, and is coupled to operational amplifier u1 through resistor R50. Operational amplifier u1 output is coupled to the base of transistor q2, which is coupled to the LED of optic coupling u6.

Upon releasing accelerator pedal b5, the transistor of optic coupling u5b ceases to conduct. Thus, the release of the accelerator can be detected. The output signal S of inverter U1, which is proportional to speed of motor M1, therefore causes a voltage drop across potentiometer P5 that is carried to the input of inverter amplifier u15 in FIG. 7. Inverter amplifier u15 transforms the positive signal into a negative signal, so that as accelerator pedal b5 is released analog input port T of inverter U1 receives a negative voltage. Inverter U1 transforms the negative voltage at input port T into a negative torque applied to the motor M1, thus causing regenerative braking to occur. This braking is proportional to the speed of motor M1, and ceases when the speed of motor M1 is reduced when optic coupling u11a ceases to conduct.

If in addition to releasing the accelerator pedal the brake pedal (not explicitly shown) is pushed, the transistor of optic coupling u6 increases the effect of inverter amplifier u15, increasing even more the regenerative braking which is proportional to the position of the brake pedal (not explicitly shown) and the speed of motor M1.

To reverse the motor, the excitation of optic insulator u7b is eliminated and optic insulator u8b is excited by applying logic high to resistor R18. Thus, a negative signal is sent to input port T of inverter U1 and motor M1 reverses. Regenerative braking does not work when the vehicle is reversing.

Figure 10:
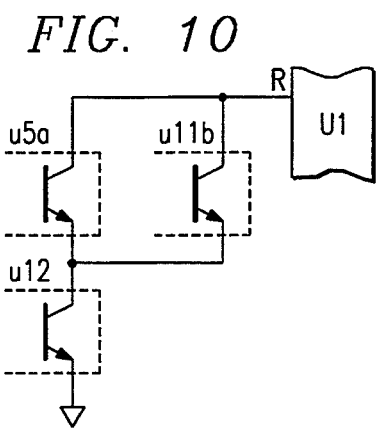

FIG. 10 shows a circuit diagram of control circuitry in accordance with the present invention. To activate inverter U1, it is necessary to apply a logic low signal to the digital input port R of inverter U1, which occurs when optic couplings u12 and u5a are excited.

When accelerator pedal b5 is released, inverter U1 is deactivated and regenerative braking is thus inactive. The transistor of optical coupling u5a is thus turned off, and input port R to inverter U1 may be turned on only through the transistor of optic coupling u11b. Optic coupling u11b reacts in a similar manner as optic coupling u11a, that is, it is conducting when the motor speed is above a minimum speed.

Figure 11:
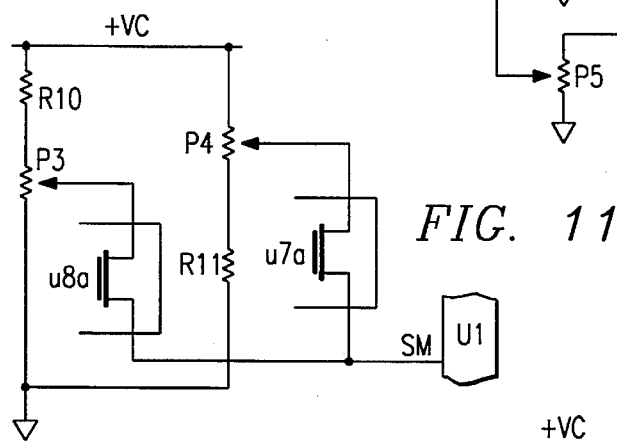

FIG. 11 shows a circuit diagram of control circuitry in accordance with the present invention. The forward and reverse speed limits must be capable of being adjusted separately. The reverse speed must be very low due to the geometry formed by the current collectors and the overhead line (not explicitly shown). The voltage divider formed by potentiometer P4 of FIG. 11 and resistor R11 is used to limit the forward speed through the transistor of optic coupling u7a, to the analog input port SM of inverter U1. This limits the forward speed, and is only applied to input port SM of inverter U1 when the transistor of optical coupling u7a is conducting, i.e. when the vehicle is moving forward. The voltage divider formed by potentiometer P3 of FIG. 11 and resistor R10 is used to limit the reverse speed, and is coupled through the transistor of optic coupling u8a to analog input port SM of inverter U1. This limits the reverse speed, and is only applied to input port SM of inverter U1 when the vehicle is in reverse.

I claim:

1. An electrical system in a vehicle that receives power from an external power source, comprising:

an inverter adapted to receive a DC input from the external power source and to generate a variable voltage output therefrom;

first and second current collectors coupled to the inverter and operable to receive the DC input through contact with positive and negative poles, respectively, of the external power source, wherein the external power source includes at least one short-circuit zone in which the first and second current collectors become short-circuited with respect to one another as the vehicle passes therethrough;

a motor electrically coupled to the inverter and operative to generate from the variable voltage output a motive torque;

an internal DC bus having first and second leads coupled to first and second current collectors, respectively; and a protection circuit coupled to the internal DC bus, wherein the protection circuit is operable to permit the internal DC bus in the inverter to receive the DC input from the external power source, protect the inverter from connection of the leads to an input of improper polarity, and permit the inverter to deliver DC power to the external power source during a regenerative braking operation in the vehicle.

2. The system of claim 1 wherein the protection circuit further includes a varistor and a diode coupled to the internal DC bus.

3. The system of claim 1 wherein the motor is a three-phase asynchronous traction motor.

4. The system of claim 1 wherein the inverter generates a three-phase AC voltage output from the DC input.

5. The system of claim 1 further comprising:

a detector coupled to the inverter for detecting a release of an accelerator; and a circuit coupled to the inverter for applying a negative torque signal to the motor in response to the detected release to thereby provide regenerative braking.

6. The system of claim 5 further including a circuit coupled to the inverter for monitoring an operating speed of the motor, and wherein the negative torque signal applied to the motor is a function of the motor speed.

7. The system of claim 5 further including:

a circuit coupled to the inverter for sensing the application of brakes; and a circuit coupled to the inverter for increasing the magnitude of the negative torque signal in response to the application of the brakes, to thereby enhance regenerative braking.

8. The system of claim 1 further including:

a circuit coupled to the internal DC bus for detecting the short-circuit zone as the first and second current collectors enter the short-circuit zone; and a circuit coupled to the internal DC bus for isolating the inverter from at least one of the first and second current collectors as the current collectors pass through the zone.

9. The system of claim 12 wherein the circuit for detecting the short-circuit zone includes:

an inductor coupled to at least one of the current collectors and operative to generate an induced signal in response to current flowing between the inverter and one of the poles of the external power source, wherein the induced signal is substantially altered when at least one of the current collectors contacts an insulator connected in series with at least one pole of the power source in the vicinity of the short-circuit zone; and a coupling coupled to the inductor operable to convert the induced signal to a first logic signal indicative of whether the current collector has contacted the insulator.

10. The system of claim 9 wherein the circuit for isolating the inverter from at least one of the current collectors further includes:

a comparator coupled to the inverter and adapted to receive an output signal from the inverter and to generate therefrom a second logic signal indicative of whether the motor is producing a regenerative torque;

a logic gate coupled to the coupling and the comparator, the logic gate operable to receive the first and second logic signals, respectively, therefrom, wherein the logic gate produces a third logic signal; and a switch responsive to the third logic signal and operable to disconnect the current collector from the inverter when the current collector has contacted the insulator and the motor is producing a regenerative torque.

11. In an electrical system for use in a vehicle which operates on electrical power provided by an external power source, a method comprising the steps of:

receiving a DC input from the external power source contacting first and second current collectors with positive and negative poles, respectively, of the external power source;

generating a variable voltage output from the DC input;

generating from the variable voltage output a motive torque;

delivering a DC output to the power source poles during a regenerative braking operation; and blocking the current through the leads of the internal DC bus when connected to an input of improper polarity.

12. The method of claim 11 wherein the step of generating a variable voltage output includes generating a three-phase AC voltage output.

13. The method of claim 11 further including the steps of:

detecting a release of an accelerator; and applying a negative torque signal to the motor in response to the detected release such that regenerative braking is provided.

14. The system of claim 13 further including the steps of:

monitoring the operating speed of the motor;

comparing the speed of the motor to a predetermined minimum speed; and applying the negative torque signal to the motor when the speed is above the predetermined minimum speed, wherein the applied negative torque signal is proportional to the motor speed.

15. The system of claim 13 further including the steps of:

sensing the application of brakes; and increasing the magnitude of the negative torque signal in response to the application of the brakes, to thereby enhance the regenerative braking provided.

16. The method of claim 11 further including the steps of:

receiving the DC input through contact of first and second current collectors with positive and negative poles, respectively, of the external power source, wherein the external power source includes at least one short-circuit zone in which the first and second collectors can become short-circuited as the current collectors pass therethrough;

detecting the short-circuit zone as the current collectors enter the short-circuit zone; and isolating the inverter from at least one of the first and second collectors as they pass through the short-circuit zone.

* * * * *

UNITED STATES PATENT AND TRADEMARK OFFICE
CERTIFICATE OF CORRECTION

PATENT NO. : 5,565,751
DATED : October 15, 1996
INVENTOR(S) : Greiser

It is certified that error appears in the above-identified patent and that said Letters Patent is hereby corrected as shown below:

Column 2, line 26 after "numbers" delete "generally".

Column 4, line 5 after "C1" insert -- in FIG. 5 --.

Column 7, line 43 before "contacting" insert -- by --.

Signed and Sealed this

Fourth Day of March, 1997

*Attest:*

BRUCE LEHMAN

*Attesting Officer*      Commissioner of Patents and Trademarks